Oct. 22, 1929.  J. DIERKS  1,732,643
BREAD BOX
Filed April 23, 1925
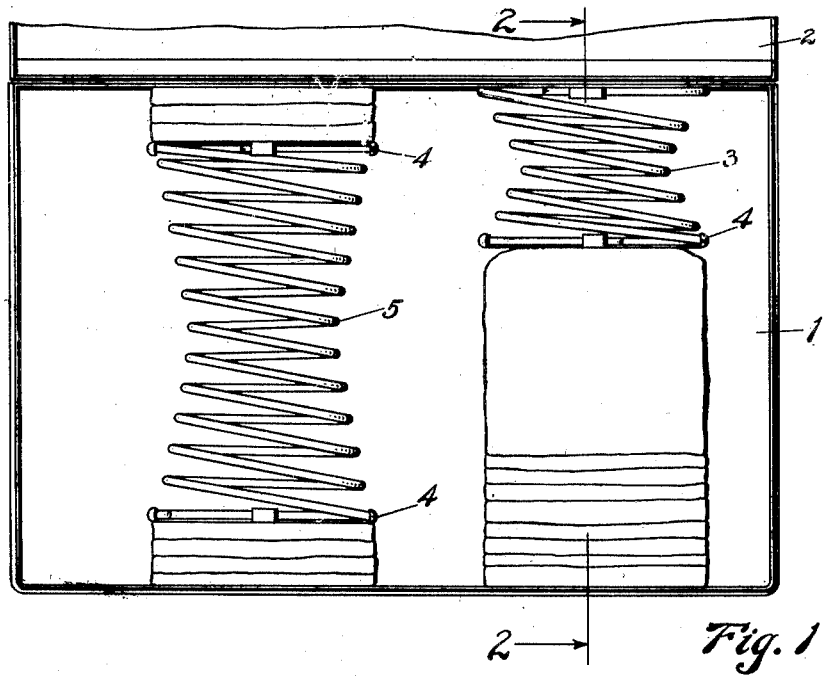
Fig. 1
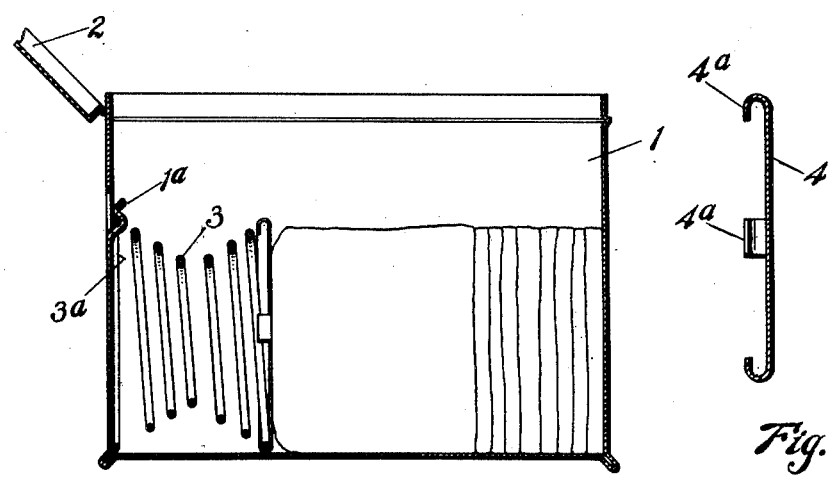
Fig. 2
Fig. 4
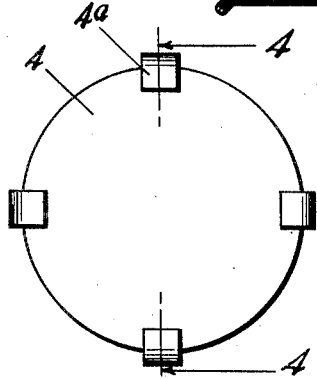
Fig. 3
Inventor
John Dierks
By A. B. Bowman
Attorney Patented Oct. 22, 1929

1,732,643

UNITED STATES PATENT OFFICE

JOHN DIERKS, OF GLENDALE, CALIFORNIA

BREAD BOX

Application filed April 23, 1925. Serial No. 25,313.

My invention relates to bread boxes, more particularly to boxes which are used for preserving bread, cake or the like after the loaf has been cut, for preventing the slices and loaf from drying out, and the objects of my invention are:

First, to provide a box of this class with means in connection therewith for holding the separate slices of bread or cake in certain close relation to each other the same as before they were cut from the loaf, thus reducing their liability to dry out to a minimum; second, to provide an apparatus of this class that may be used in connection with the loaf and several slices or with the separate slices alone if desired; third, to provide a device of this class that tends to hold the wrapper on the loaf in the bread box; fourth, to provide a device of this class that may be attached to the box or may be separate from it and used between separate bunches of slices in their certain relation to each other and fifth, to provide a bread box of this class which is very simple and economical of construction, durable, efficient, sanitary and in which the supports for the bread or cake may be readily removed for sterilizing or for placing the bread in position.

With these and other objects in view as will appear hereinafter, my invention consists of certain novel features of construction, combination and arrangement of parts and portions as will be hereinafter described in detail and particularly set forth in the appended claim, reference being had to the accompanying drawings and to the characters of reference thereon, which form a part of this application in which:

Figure 1 is a top view of my bread box with the bread supporting means positioned therein and showing in one end a part of a loaf and several slices held in their certain relation to each other and in the other end two spaced bunches of slices of bread with the supporting device interposed between the slices. Fig. 2 is a sectional view through 2—2 of Fig. 1. Fig. 3 is an enlarged side elevational view of the plate which engages the bread or cake and is secured to the spring and Fig. 4 is a sectional view through 4—4 of Fig. 3.

Similar characters of reference refer to similar parts and portions throughout the several views of the drawings.

The box member 1, cover 2, spring 3, plates 4, and spring 5, constitute the principal parts and portions of my bread box.

The box member 1 and cover 2 are the conventional metal bread box and cover except that in some cases it is desirable to secure the spring 3 to one side of the bread box, in which case the one side is provided with an inwardly extending integral hook member 1ª which is adapted to receive and support the one end loop 3ª of the spring members 3, as shown best in Figs. 1 and 2 of the drawings. The springs 3 and 5 are preferably spiral springs which are large at their opposite ends and relatively small at the middle portion, as shown. Mounted on the opposite end of the spring member 3 is a plate 4 which is preferably a metallic plate provided with extended portions 4ª on its periphery which are adapted to be bent over the end loop of the spring and support the plate 4 in position over the end of the spring. There is also provided a spring 5 similarly constructed but relatively longer, which spring 5 is provided with the plates 4 on its opposite ends and is loosely positioned in the box so that it can be readily removed and may be interposed between two bunches of slices of bread or cake positioned against the sides of the box or between one side of the box and a bunch of slices of bread or cake.

It will be noted that the spring 3 may be made the same as spring 5 with the members 4 on opposite ends and loosely mounted in the box if desired.

Though I have shown and described a particular construction, combination and arrangement of parts and portions I do not wish to be limited to this particular construction, combination and arrangement but desire to include in the scope of my invention the construction, combination and arrangement substantially as set forth in the appended claim.

Having thus described my invention, what I claim as new and desire to secure Letters Patent, is:

In a bread box, a conventional bread box having a cover at one side, a compression spring positioned therein with its ends extended toward opposite fixed sides of the box adjacent the cover of the box, plates secured to the opposite ends of said spring, adapted to engage slices of bread for holding them in close relation to each other, between said plates and the fixed side wall of the box, whereby the slices of bread are held tightly together to reduce their liability to dry out to a minimum.

In testimony whereof, I have hereunto set my hand at Los Angeles, California, this 15th day of April, 1925.

JOHN DIERKS.